INVENTOR
Austin S. Norcross
BY Thomas A. Jenckes
Attorney

March 10, 1953

A. S. NORCROSS 2,630,819

METHOD AND APPARATUS FOR CONTROLLING
THE VISCOSITY OF A PROCESSING LIQUID

Filed June 9, 1948

INVENTOR
Austin S. Norcross
BY Thomas A. Jenckes
Attorney

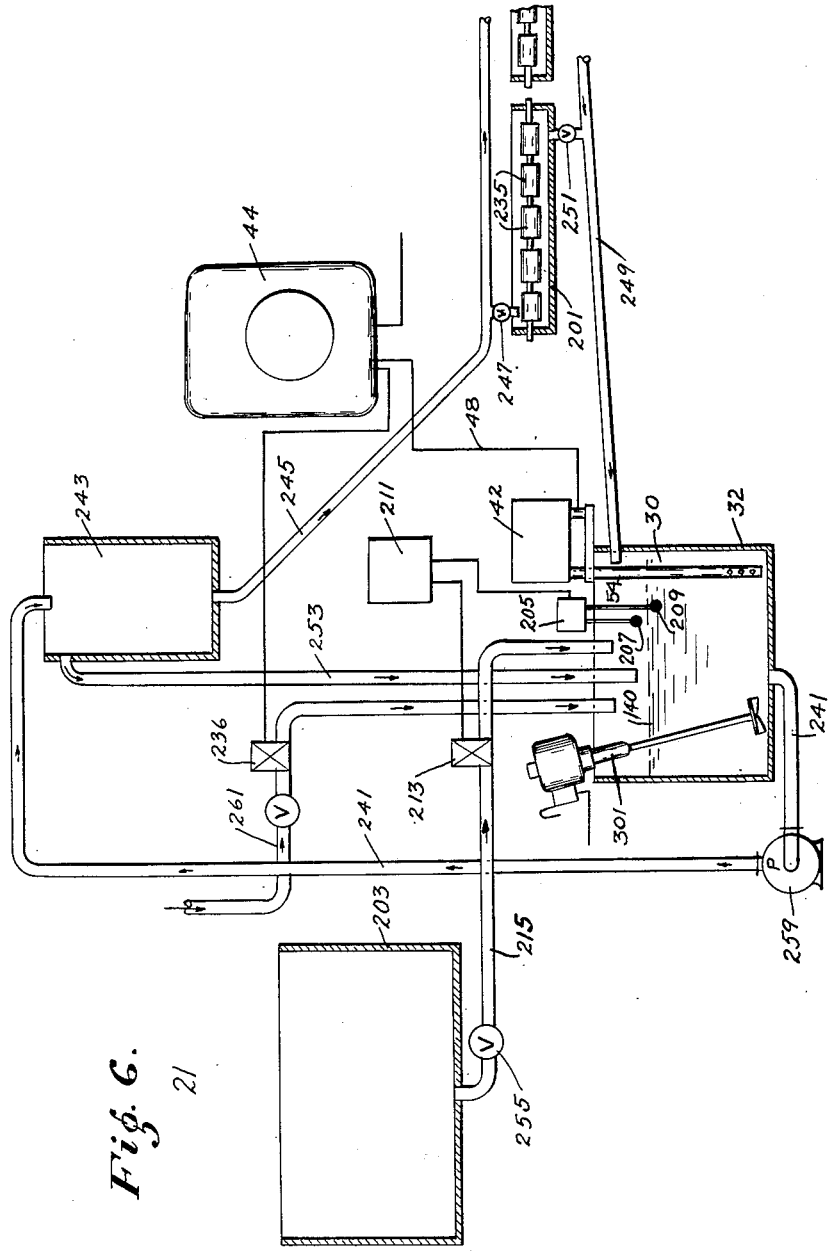

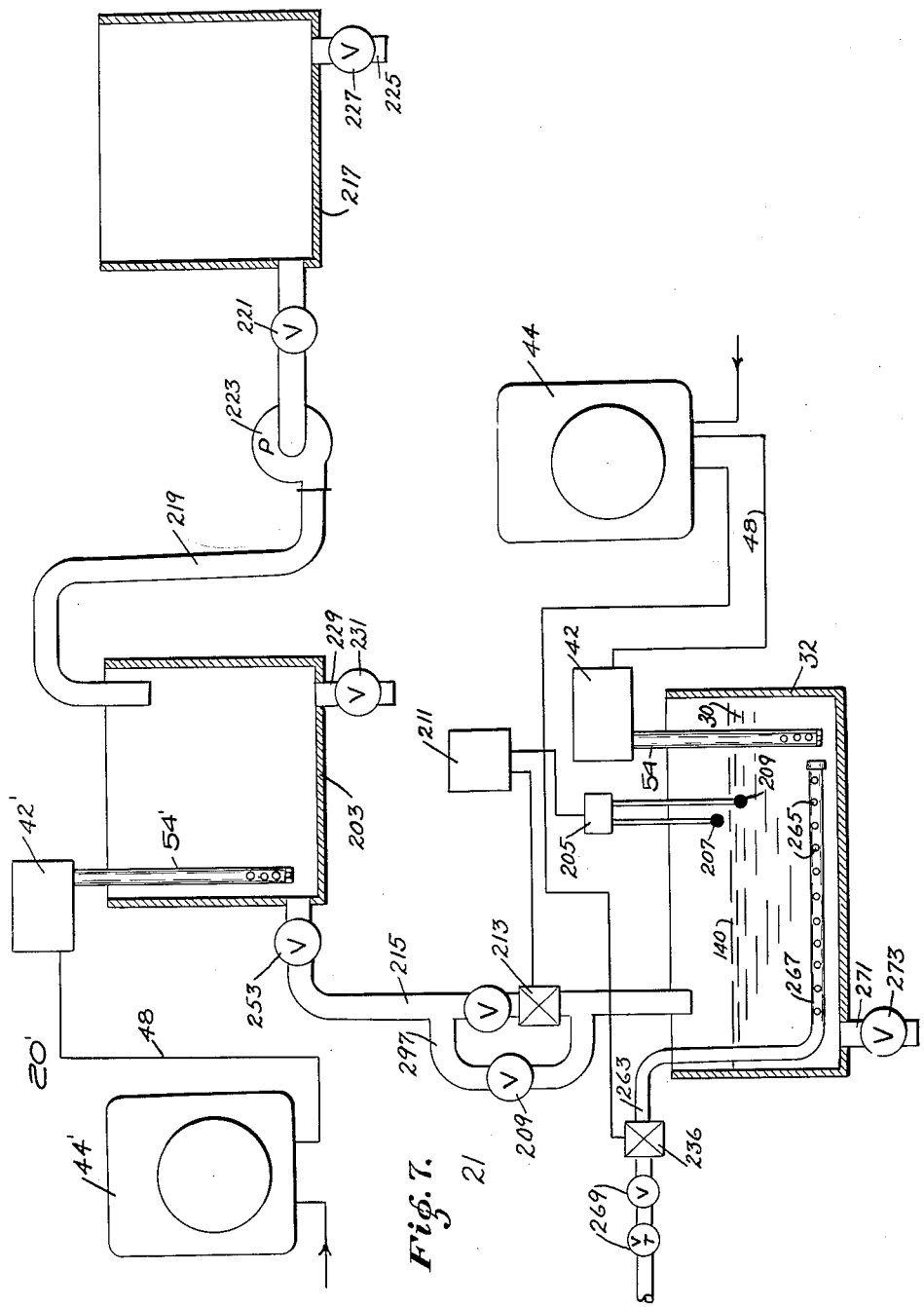

March 10, 1953  A. S. NORCROSS  2,630,819
METHOD AND APPARATUS FOR CONTROLLING
THE VISCOSITY OF A PROCESSING LIQUID
Filed June 9, 1948  6 Sheets-Sheet 5

INVENTOR
Austin S. Norcross
BY Thomas A. Jenckes
Attorney

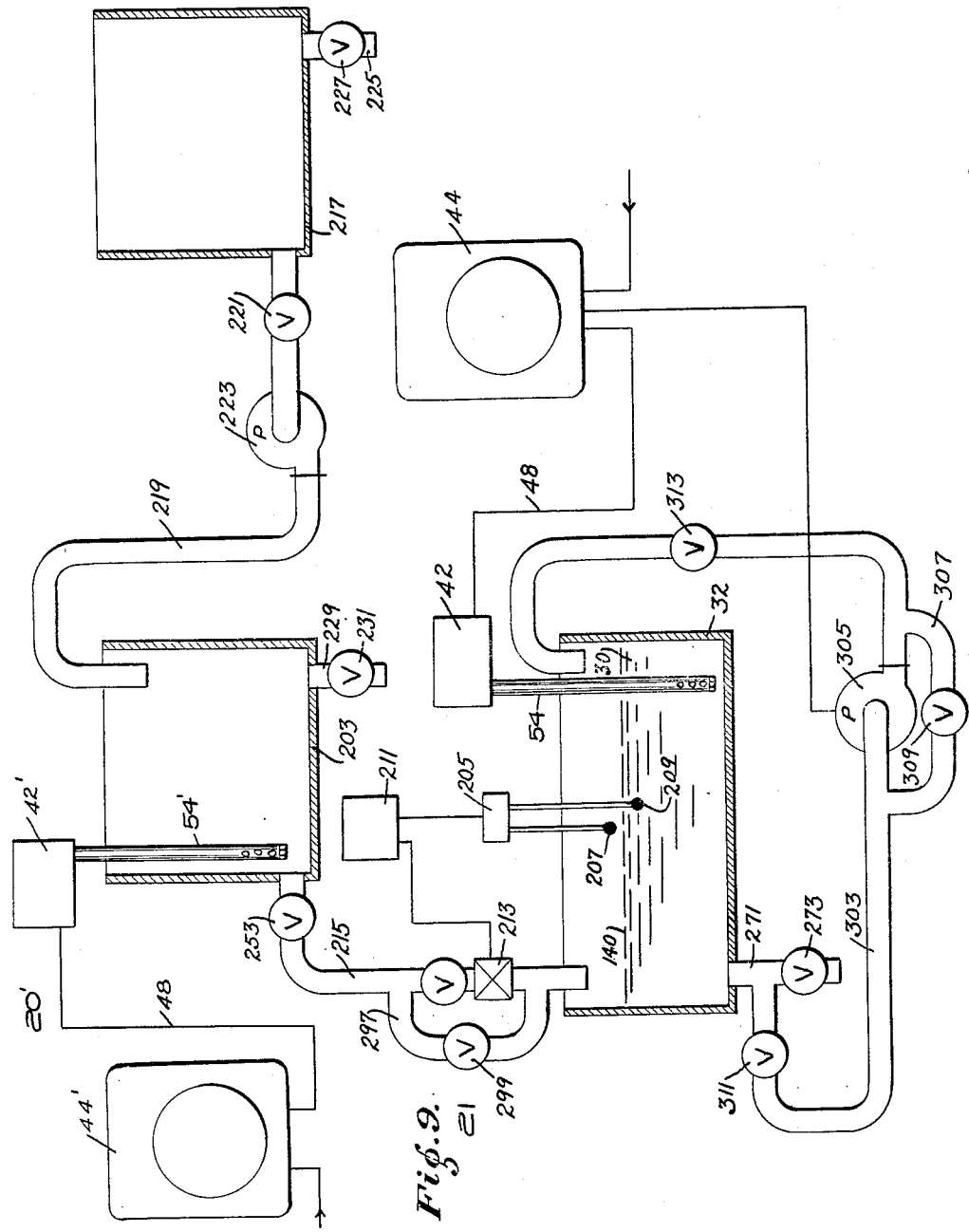

Patented Mar. 10, 1953

2,630,819

UNITED STATES PATENT OFFICE 2,630,819

METHOD AND APPARATUS FOR CONTROLLING THE VISCOSITY OF A PROCESSING LIQUID

Austin S. Norcross, Waban, Mass.

Application June 9, 1948, Serial No. 32,014

25 Claims. (Cl. 137—92)

My invention relates to a novel method of and apparatus for controlling the viscosity of a processing liquid in a processing system having a tank.

A main object of my invention is to provide a device or method by which the viscosity of a liquid in a processing system having a tank may be controlled while said system is being used for processing goods. My invention may be employed with the aid of a human assistant or automatically. In practice, I preferably employ as a measuring device and initial steps in the method, the method and apparatus shown and claimed in my application for patent, S. N. 552,292, filed September 1, 1944, now Patent 2,491,389, dated Dec. 13, 1949, for Methods of and Apparatus for Measuring the Visocity of a Liquid in a Tank and specifically operating through the specific type of recorder shown therein, although, if desired, my improved control and alarm system may be actuated by any movable member in turn controlled by the measuring device. Insofar as common subject matter is concerned, my invention has all the advantages portrayed in said application, but goes further and provides means whereby the viscosity may be controlled in used.

An object of my invention, therefore, is to provide a processing system which may be completely automatic so as to dispense with the necessity of any technician samplers or other operatives in use, thereby greatly lessening the cost of controlling the viscosity of the processing liquid.

A further object of my invention is to provide a device which will perform a more efficient operation of controlling the viscosity by doing it in routine machine fashion, obviating any failure in the human factor.

A further object of my invention is to provide a supplemental safety alarm device for high and/or low viscosity readings which provide an insurance against any breakdown in an automatic mechanism, or, if desired, signals to the operator that it is time to do his job to vary the viscosity.

Further features of my invention relate to the specific improvements in construction of my improved device and my improved method.

These and such other objects of my invention as may hereinafter appear will be best understood from a description of an embodiment thereof such as shown in the accompanying drawings.

Fig. 6 is a diagrammatic view illustrating my invention employed in a processing system for sizing nylon yarns prior to knitting, comprising a blending embodiment, with the liquid to be added comprising a diluent.

Fig. 7 is a diagrammatic view illustrating my invention employed in a processing system for sizing warps prior to weaving, comprising a blending embodiment, with the liquid to be added being of a type to increase the viscosity of the processing liquid.

Fig. 9 is a diagrammatic view illustrating my invention employed in a processing system for sizing warps prior to weaving, comprising an agitating system to agitate the processing liquid to vary the viscosity thereof.

Figure 1:
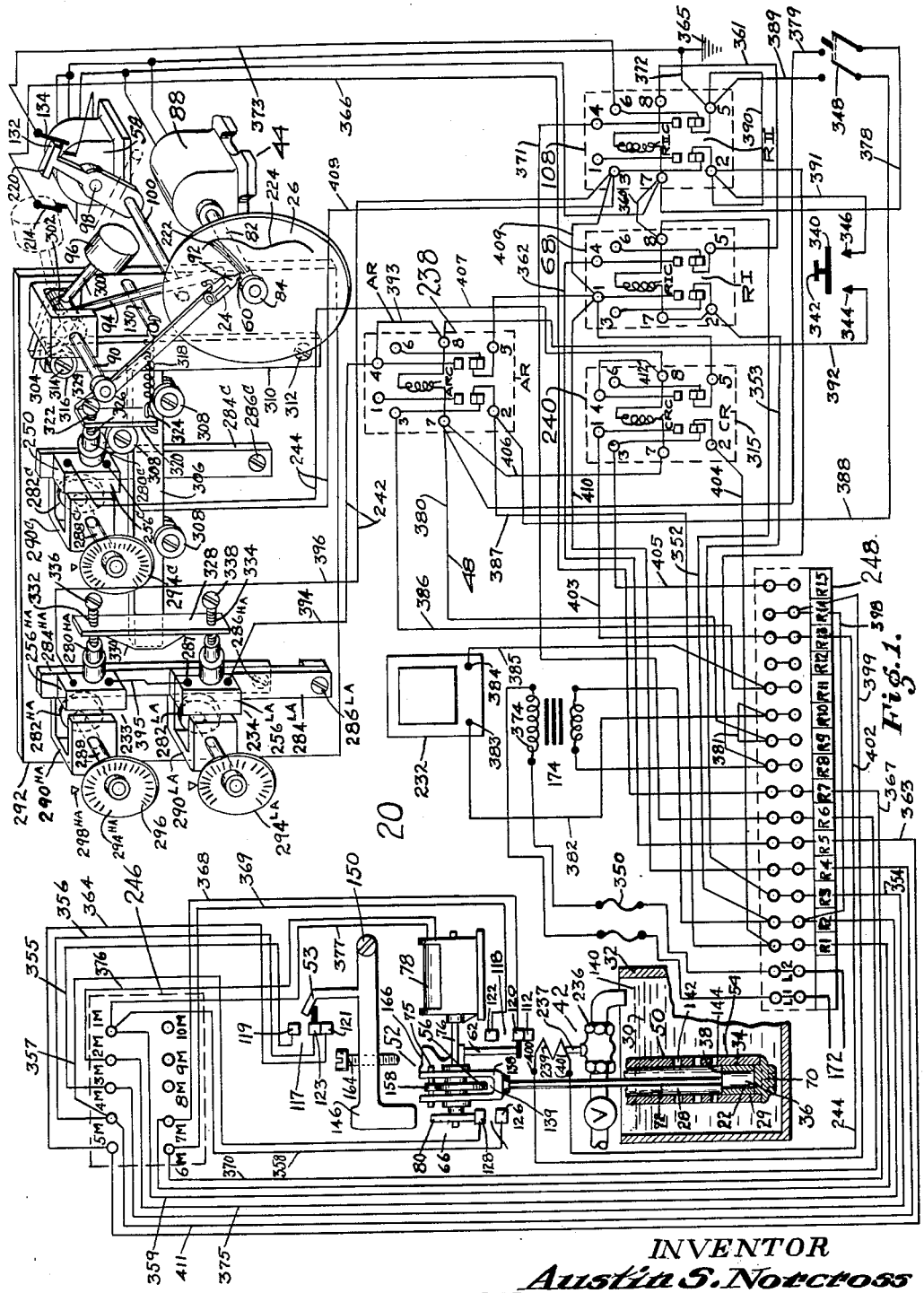
Fig. 1 is a diagrammatic spread out view partially shown in mechanical perspective, elevation and section, with the electrical features thereof shown as an electrical diagram.

In the drawings, wherein like characters of reference generally indicate like parts throughout, 20 generally indicates a device or apparatus for controlling the viscosity of a liquid in a processing system constructed in accordance with my invention. As also stated, I preferably employ as the first steps thereof the method and apparatus shown in my aforementioned Patent No. 2,491,389 for Methods of and Apparatus for Measuring the Viscosity of a Liquid in a Tank, wherein my invention broadly includes the method of measuring a liquid of varying viscosity in a tank which comprises mechanically measuring values of the viscosity, transforming said mechanical measurements into electrical quantities, and converting said electrical quantities into movements of an element of an indicating means, preferably by cyclically electrically transforming successive values of said viscosity into successive electric signals of time durations each a function of each successive viscosity and transforming said electric signals into successive movements of an element of an indicating means and suitable apparatus for broadly accomplishing this purpose. In the method specifically shown and diagrammatically illustrated in Fig. 1, I successively forcibly flow similar fixed quantities of a viscous liquid under a substantially constant pressure through a restricting orifice 22 of a relatively small predetermined size and successively energize an electric circuit for time durations equal to the successive time durations of said successive flows and by said successive flows of current successively move a movable member 24 laterally over a chart 26 moving at a fixed rate successive amounts indicating the said successive time durations of the said successive flows of liquid. In the specific embodiment of the method utilized, the successive flows of liquid are provided by confining a vertical column of liquid 28 in a true cylinder 29 taken from the liquid 30 in a tank 32 and successively freely dropping a member 36, spaced such a distance from the wall 34 of said cylinder as to permit the flow of viscous liquid between said cylinder wall and falling member from a fixed point 38 in said cylinder to the bottom of said cylinder to flow annular streams of liquid upwards through the annular orifice 22 provided around the edge of said freely falling member 36.

In my preferred embodiment, I have successively provided the samples between said successive intervals of flow caused by said successive droppings of said droppable member 36 by successively raising said droppable member 36 between the intervals of its falling movement to flow annular streams of liquid downwardly through said orifice 22 to the bottom of said column 28 around the edge of said rising droppable member 36 drawn from the liquid 30 in the tank 32 so that another sample will be ready for the sampling phase in the next cycle of operation.

My improved method includes the method of controlling the viscosity of a processing liquid in a processing system having a tank, which comprises cyclically measuring the viscosity of said processing liquid in said tank in any suitable manner such as in the manner hitherto described or in any other suitable manner and successively changing the physical characteristics of said liquid in said system in accordance with said measurements to bring it to and maintain it substantially at a predetermined desired viscosity. The physical characteristics may be changed in any suitable manner by an operative, but preferably by the specific automatic mechanism I have shown for the above purpose in the drawings. I have shown three species of different manners of doing this. In use, the processing tank 32 is usually connected as part of a closed processing system 21 of the types diagrammatically illustrated in Figs. 6-9. Figs. 6 and 7 diagrammatically illustrate one method of changing the physical characteristics of said processing liquid in said system to maintain it substantially at a predetermined desired viscosity, i. e., the embodiment of successively blending said liquid 30 in said tank or system with a liquid of a different viscosity in said system in accordance with said measurements to bring it to and maintain it substantially at a predetermined desired viscosity.

In the embodiment shown in Fig. 6, illustrating a processing system for sizing nylon yarns prior to knitting and in which the size solution tends to thicken during use, I have shown means to add a diluent such as water to the mixing tank 32 for this purpose.

In the embodiment shown in Fig. 7, where the size solution 30 tends to weaken in use, I have shown means to add a thickening liquid to the size to blend the size of a weakened viscosity with a liquid of greater viscosity to bring the size liquid to and maintain it substantially at a predetermined desired viscosity.

As an alternative method of changing the physical characteristics of said liquid in said system, I may accomplish it by successively changing the temperature of the liquid in said system, as by adding a steam pipe in said tank 32 to raise the temperature of the viscous liquid 30 to make it less viscous.

Figure 8:
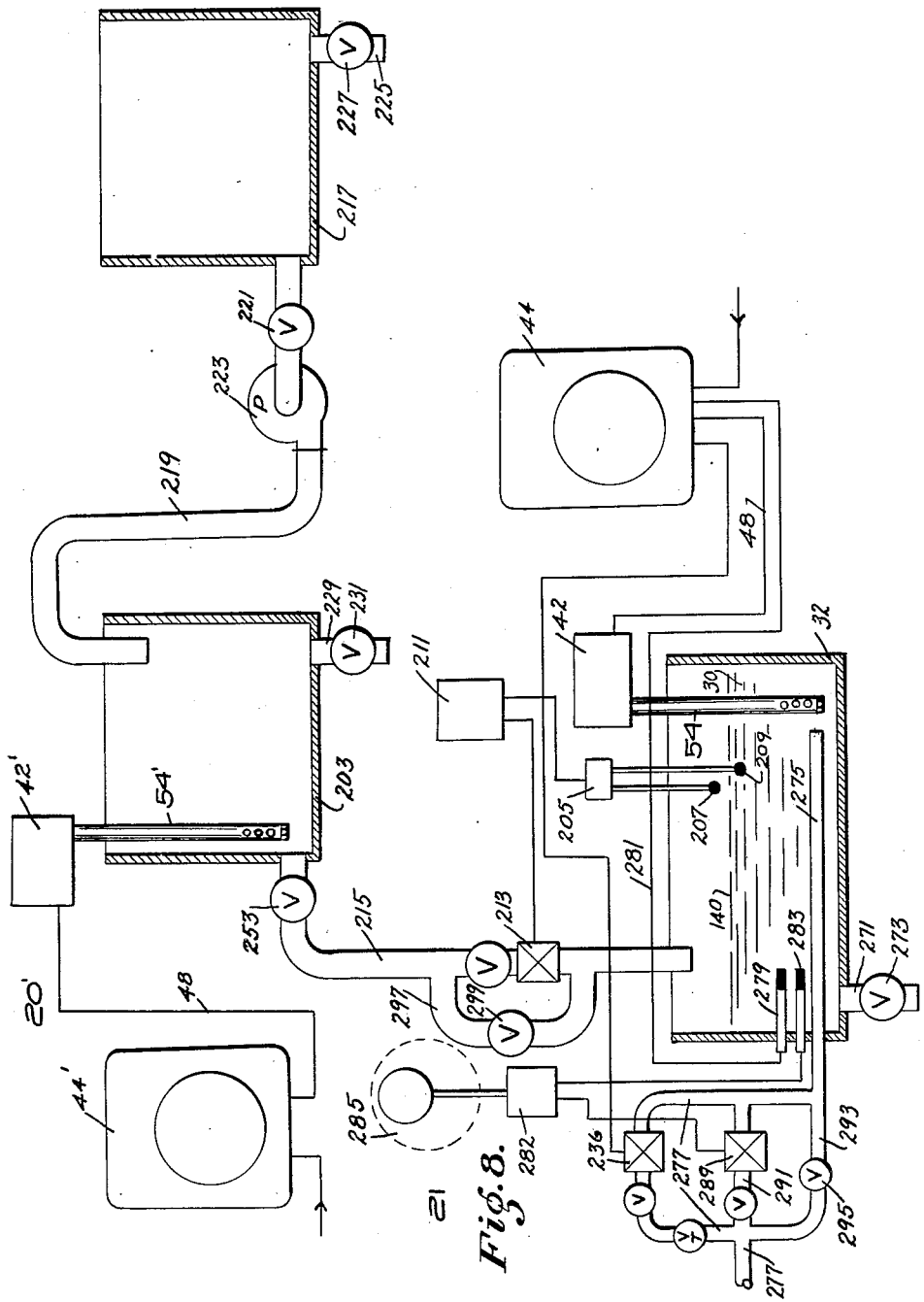
Fig. 8 is a diagrammatic view illustrating my invention employed in a processing system for sizing warps prior to weaving, comprising a temperature control for varying the viscosity of the processing liquid.

It is obvious, however, that the viscosity of various liquids do not vary in the same proportion and that some liquids may even get more viscous on the application of heat, in which case it might be desirable to substitute a coolant pipe for the steam pipe shown in Fig. 8.

If the processing liquid has what may be generally termed thixotropic properties, which term it is to be understood includes changes in viscosity resulting from mechanical agitation whether or not such changes are reversible phenomena, a still further alternative method of changing the physical characteristics of the liquid may comprise agitating said liquid predetermined amounts in said system in accordance with said measurements to bring it to and to maintain its substantially at a predetermined desired viscosity and I have shown in Fig. 9 a suitable embodiment of my invention having a recirculating pipe for agitating the liquid and varying its viscosity. It is obvious, however, that other specific methods of changing the physical characteristics of the processing liquid to vary its viscosity may be employed.

As stated, my invention also includes apparatus for carrying out the afore-described methods. Broadly, as stated in said application, said apparatus comprises means 42 to cyclically transform successive values of said viscosity into electric signals of time durations each a function of each successive viscosity and means 44 to transform said electric signals into movements of a member 24 of an indicating or recording means so that said electric impulses may be transmitted in any suitable manner but are preferably transmitted from the means 42 to the indicating or recording means 44 through the medium of electric circuits 48. Specifically, my invention also includes the sampling means 50 to successively forcibly flow similar fixed quantities of the viscous liquid from said tank 32 under a substantially constant pressure through the restricted orifice 22 in accordance with the method hitherto described. The sampling means 50 is provided with suitable means 52 attached thereto to successively energize the electric circuits 48 for time durations equal to successive time durations of said successive flow, including a starting means 53 and a stopping means 62, the sampling means specifically comprising a cylinder 54 having a lower unbroken portion forming a true cylinder 29 to confine a vertical column 28 of liquid from within said tank 32, a member 36 freely droppable from the fixed point 38 and spaced such a distance from the wall of said column or cylinder 54 as to permit the flow of said viscous fluid between said wall and dropping member 36 to flow annular streams of liquid upwards through the orifice 22 provided between the cylindrical surface of said freely dropping member 36 and the true cylinder 29 as it drops from said fixed point 38 to the bottom of said column.

As also stated, I provide means 56 for successively raising said member 36 between intervals of its falling movement to flow annular streams of liquid down to the bottom of said column through said orifice 22 formed around the surface of said member 36 drawn from the liquid 30 in the tank 32. For this purpose, I provide a continuously rotatable member such as the cam 56 to control the sampling means 50 to cyclically flow fixed quantities of said viscous fluid under substantially constant pressure through the restricted orifice 22 during a portion of said cycle of revolution of said member 56.

As the indicating or recording means 44 in the embodiment shown, I also provide a reversible electric motor 58 having a pen arm 24 movable laterally over a recording surface 26, normally energized to move said pen arm to a zero position, the means 53 hitherto described to energize the circuits 48 at the initiation of fluid flow in each cycle functioning to start said motor 58 in the opposite direction to move said pen arm laterally over said chart away from zero position 60. I also provide means 62 to electrically deenergize said motor at a variable point in each cycle coincident with the cessation of liquid flow to stop the lateral movement of said pen arm 24, and means 66 operable at a fixed subsequent point of each cycle to electrically energize said motor to return said pen arm 24 to zero position 60.

Looking at my invention from another aspect, it includes sampling means 50, means 52 to transform the respective viscosity measurements of successive samplings of said sampling means into electrical signals of time durations each a function of each successive viscosity, said sampling means 50 and transforming means 52 making up the sampling unit 42, the electric circuits 48 to transmit said electric signals and means including the recording unit 44 to transform said electric signals into movements of an element 24 of a measuring means, and means 56 to cyclically actuate said device through the following phases; an apparatus clearing or resetting phase with suitable means 66 being provided to clear or reset all electrical elements in the device during a portion of each cycle, a sample loading phase, a cocking phase including means 68 to cock the device at the completion of said loading phase and a sampling phase initiated by the firing stage and completed at the cease firing stage during which the viscosity of the sample is transformed into electric signals, the time duration of each of which is a function of the then viscosity of the liquid.

In the specific embodiment shown, the sampling unit 42 includes the sampling means 50 which comprises a cylinder 54 extending vertically below the level of the viscous fluid 30 in the tank 32 to be measured having a closed lower end 70. The falling member 36 comprises a piston 36 of less height than the portion 29 of the cylinder 54 through which the piston falls and of less circumference than the inner periphery of said cylinder to permit respective counterflows of annular columns of the viscous liquid to be measured through the orifice 22 on the up and down movements of the piston 36 in said cylinder 54. A piston rod 72 projects upwardly from said piston 36 and has a lateral projection 75 connected thereto provided with a roller 158. I also employ a cam shaft 76, a cam 56 abutting said projection 75 to raise said piston 36 and to permit it to drop freely, and a motor 78 for rotating said cam shaft. The resetting or clearing means 66 also includes a supplemental cam 80 mounted on said cam shaft 76. The indicating means or recorder 44 comprises a recorder shaft 82 having chart holding means 84 for holding the chart 26 mounted thereon and a synchronous motor 88 for rotating said shaft 82. The recording pen arm 24 is provided with a pivot shaft 90 pivotally mounted at a distance from said shaft 82 to pivot the pen or other indicating member 92 substantially radially of said chart 26 and an operating arm 94 is mounted on said pivot shaft 90 preferably weighted as by the weight 96 and/or urged by the spring 318 to pivot said pen arm to its radially innermost zero position 60. I also provide the reversible motor 58 having a partial revolution throw for moving said recording arm 24 radially outwardly, having a motor shaft 98 having an operating arm 100 projecting radially therefrom to abut said recording arm operating arm 94 to urge said recording arm 24 radially outwardly and to function as a positionable abutment on reverse rotation of said reversible motor 58 to permit the gravity bias of said weight 96 to move said pen arm 24 radially inwardly to zero position.

Figure 2:
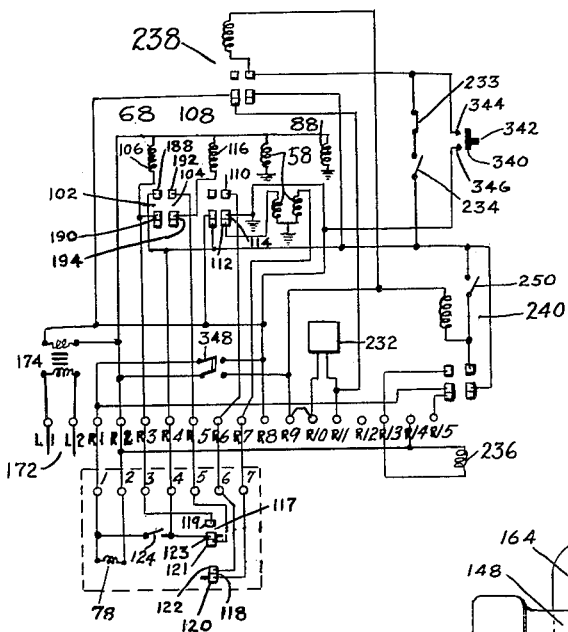
Fig. 2 is a simplified electrical diagram of the electrical features shown in Fig. 1.

In order that the viscosity measuring portion of my invention may be compared as method and apparatus with the disclosure in my Patent 2,491,389 aforesaid, I have shown in Fig. 2 an electric diagram which is a simplified condensed electrical diagram of the more complicated diagram shown in Fig. 1, but which may be more easily compared with the showing in said application. I have, therefore, in Fig. 2 referred to the parts with the same numbers as used in said patent, but to avoid a great many reference characters on Fig. 1 I have used simple numbers for all the parts of the different relays, referring to each relay respectively, i. e., relay I, or the cocking relay 68 as RI, the firing relay 108 or relay II as RII, the alarm relay as AR and the control relay as CR, and as all respective contacts and terminals of these respective relays are the same, I have numbered them with their respective numbers 1–8 on their respective relays.

I also provide a cocking relay 68 or RI, having double pole double throw contact parts 102 and 104 and a coil 106 or RIC energized when said piston 36 is moved to its uppermost position. I also provide a firing relay 108 or RII having double throw double pole contacts, one pole having upper and lower fixed contacts 110 or 4 and 112 or 6 and a movable contact 114 or 5 providing a double throw switch and a coil 116 or RIIC energized through said cocking relay 68 or RI as the piston drops, to throw said movable contact 114 or 5 against said fixed contact 110 or 4 of said firing relay 108 or RII into a position to start said reversible motor 58 and to move said pen arm 24 laterally from zero position when the circuit is completed thereto. As also stated I provide means 52 to control the sampling cycle and to transform the time durations of dropping of said movable member 36 into corresponding electrical impulses. For this purpose, I provide a starting switch 117 comprising a double throw single pole switch having a fixed upper contact 119, a fixed lower contact 121 and an intermediate movable contact 123 normally abutting said fixed lower contact 121.

I also provide suitable means 53 mechanically actuated by said piston to make the starting switch 117 perform the double function of cocking the relay 68 or RI as the piston completes its loading stroke and as it drops away from its highest point on the firing stroke to permit the poles of said switch to change to actuate the firing relay 108 or RII through the cocking relay 68 or RI in the manner explained. I also provide means 62 to stop the transmission of electricity, comprising a switch 118 having the fixed contact 122 and the movable contact 120 actuated as said piston 36 comes adjacent the end of its falling stroke to break the flow of current through said controlling relay 108 or RII to stop said motor 58. The mechanical means 52 to actuate the switches 117 and 118 on movements of the piston 36 will be described later. I also provide a releasing or resetting switch 66 having a fixed contact 126 connected indirectly to the transformer 174 and a movable contact 128 connected to said relays 68 or RI and 108 or RII and actuated by said supplemental cam 80 to deenergize said relays to permit the contact 114 or 5 of the firing relay 108 or RII to drop in a direction to actuate said reversible motor to move the pen arm to zero position, during the cycle of revolution of said cam shaft.

The supplemental cam 80 mounted on said cam shaft 76 to move said movable contact 128 to closed position has an inwardly projecting V-shaped portion 81 to receive the abutment 133 of the arm 127 of the movable contact 128 to open it for a relatively small interval of time just prior to contact of the operating cam 56 with the cam follower pin 75 on each revolution of said cam 56. The cam 80 and deenergizing switch 124 thus provide the means 66 hitherto referred to for clearing or resetting all electrical elements in the device during a portion of each cycle in the manner hitherto described.

Figure 4:
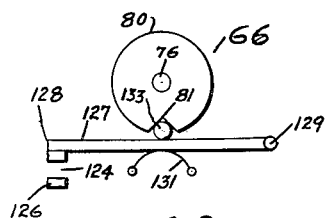
Fig. 4 is an end elevation of the recycling switch I preferably employ.
Figure 5:
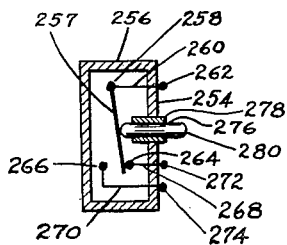
Fig. 5 is a vertical sectional view taken through the controller switch.
Figure 3:
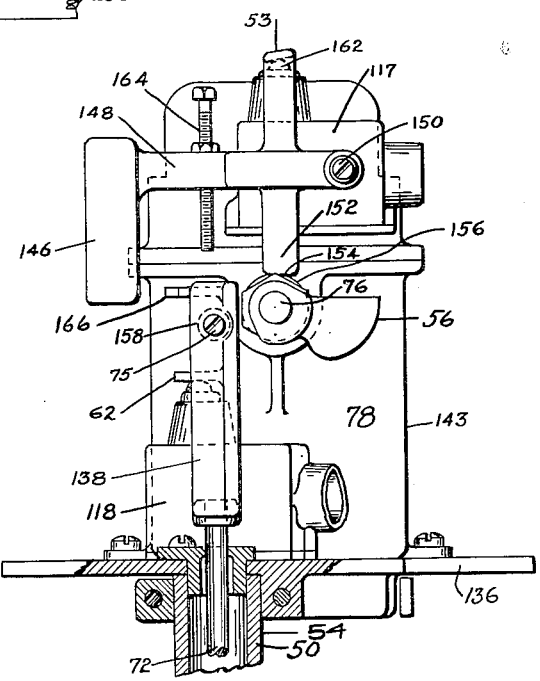
Fig. 3 is an end elevation of the improved sampler I preferably employ.

As shown in Fig. 4, for this purpose, said movable contact 128 may be mounted on the arm 127 pivotally mounted at 129 and normally urged upwardly by the spring 131 to continuously urge a projection 133 therefrom against the periphery of the rotating cam 80.

If desired, suitable stop means such as a pin 130 may be provided to abut said pen arm actuating arm 94 to stop the inner radial movement of said pen arm at the zero position 60 and means may be provided operated by said reversible motor shaft such as the extension 132 therefrom as it nears the inner end of its throw to abut a switch 134 interposed in said circuit to break the circuit to stop said motor 58 a predetermined time after the pen arm reaches its zero position.

As stated, the normally closed inner movement switch 134 for said pen arm 24 is provided and a normally closed outer movement switch 214 for said pen arm is provided.

As stated, the stop 130 is provided to abut said pen arm actuating arm 94 to stop the inner radial movement of said pen arm 24 at the zero position 60. To actuate the switch 134, as stated, the projection 132 projects from said operating arm 100 of the reversible motor shaft 98 of a length to break the inner movement switch 134, a predetermined time after said pen arm 24 has reached the zero position 60, and a projection 220 extends from said operating arm 100 of the reversible motor shaft 98 of a length to break said pen arm outer movement switch 214 to stop said reversible motor 58 when the pen arm 24 reaches the outer limit of the chart.

It is obvious that the recording arm 24 makes a radial mark 222 on said chart 26 of a length equivalent to the time duration of the dropping of said piston 36, and hence is a measure of viscosity of the liquid just contained in the true cylinder 29.

As shown in Fig. 1, my apparatus draws a plurality of spaced radial lines 222 on the chart 26, one for each sample of viscosity. As shown, these lines decrease in radial length showing that the viscosity has decreased over a period of time, as frequently occurs in slashing operations. An imaginary broken line 224 joining the ends of the lines 222 may be visualized, thus providing a chart of the viscosity.

If desired, the starting contacts of the starting switch 117 may be so located as to energize the coil RIIC of the firing relay 108 or RII through said cocking relay 68 or RI after the piston is dropped a predetermined distance, to throw said contact 5 of the relay RII into a position to start said reversible motor 58 and similarly may the stopping switch 118 be mounted to function at a predetermined distance before the end of the falling stroke of the piston 36 to stop said reversible motor 58 so that the respective electric signals will be formed of time durations of a function of a freely falling member. Thus, broadly, the electric circuits 48 are connected adjacent said piston rod 72 and to said motor 58 to be energized on successive droppings of said piston rod 72 to actuate said motor 58 amounts to move said recording arm 24 radially outwardly over said chart 26 amounts proportionate to the time durations of said dropping movements of said piston 36 and to permit said motor 58 to return said recording arm 24 to zero position 60 intermediate said intervals of energization.

While the principles of the sampler and transmitting device are exactly similar to those shown in my copending application, in practice I have modified the physical construction of said means in the following manner:

I provide the lift motor base 136, detachably mounted on the top of the tank 32, in any suitable manner such as by means of a suitable mounting bracket (not shown). The sampling means or measuring tube 54 projects downwardly from said lift motor base into the tank 32 and the piston rod 72 projects downwardly within said tube to the piston 36. A suitable cam follower 138 is mounted on the upper end of the piston rod 72 to reciprocate vertically above said base and is provided with the transverse slot 139 therein to receive the cam 56 therein which is adapted on revolution of its shaft 76 to abut the roll 153 extending transversely through the upper end of the cam follower 138 mounted on its shaft 75 mounted therein. The motor 78 is mounted on said lift motor base. The cam follower 138 is provided with the lower cam follower arm 62 which controls the movable contact 120 of the switch 118 to allow it to move against the fixed contact 122 thereof on raising of said piston rod and cam follower.

I preferably construct my improved sampling device so that, if desired, the entire measuring rod and cam follower may be removed for cleaning purposes and for this purpose I pivotally mount the actuator 146 on the top of the front end of the lift motor casing 143. The actuator comprises a cross shaped member having a cross shaft 148 having its outer end pivotally mounted on the pivot pin 150 mounted near the outer edge of the lift motor casing 143 and a vertical shaft portion 152 having a lower end 154 adapted to rest on the motor hub casing 156 and an inwardly projecting lip 53 at the upper end thereof adapted when the actuator is pivoted to operative position to normally depress the button 162 attached to the movable contact 123 of the starting switch 117 to urge it in contact with the contact 121 to actuate the firing relay 108 or RII. The cross bar 148 of the actuator has an adjusting screw 164 vertically adjustably mounted, adapted to be contacted by the upper cam follower arm 166. By adjustment of the adjusting screw 164, therefore, may the tilting movement of the actuator be adjusted for various heights of movement of the cam follower and attached piston, serving as a fine adjustment for the magnitude of the reading of the recorder.

In order that samples may be readily taken from the liquid 30 in the tank in the system, said cylinder 54 is provided with a plurality of axially spaced perforations 142 below the liquid level 140 and terminating at a spaced distance 144 from the closed lower end 70 of the cylinder 54, providing the true cylinder 29 in which the piston 36 may reciprocate adjacent the closed lower end of the cylinder 54. The piston 36 comprises the freely droppable member of my device and is preferably of a height less than that of said true cylinder 29 and of less circumference than the inner periphery of said cylinder to provide an annular orifice 22 to permit respective counter-flows of annular columns of the viscous liquid being measured, on the up and down movements of said piston 36 within said true cylinder 29 and respective radial out-flows and in-flows for true samplings of said viscous liquid through said apertures 142 on said respective up and down piston strokes.

The above mechanism just described comprises improvements on the similar mechanism in my aforementioned Patent No. 2,491,389, although not specifically claimed herein.

I have to date described the parts of my invention as described in said aforesaid application. Due, however, to the fact that I employ the invention as a controller and as an alarm device, the addition of various parts were necessary and a complete redesigning of the electrical system and connections was necessary to provide for the addition of new parts. These will now be described.

In addition to the parts hitherto described, I provide a high and low viscosity alarm 232 which in practice preferably comprises a sound device such as a horn but may comprise a visual indication. I so modify the electric circuit that it may actuate said alarm and provide the alarm actuating portion with a high viscosity switch 233 and a low viscosity switch 234, each of which are settable for selected viscosities and are actuated in the manner described by the movable element.

I also provide various types of means for changing the physical characteristics of the liquid 30 in the system and I supplementally provide an electric circuit for actuating said changing means 236, having a switch 250 therein settable for selected variations from a predetermined point and actuated by said movable element to cause said changing means to function until the viscosity is brought substantially to said predetermined point.

In addition to the alarm devices, I provide an alarm circuit having an alarm relay 238 or AR and I also provide a control relay 240 or CR in the control circuit to actuate the means for controlling or changing the physical characteristics of said liquid in said system.

I have shown in the drawings three different manners of varying the physical characteristics of the processing liquid.

In Figs. 6 and 7 I have shown systems for varying the viscosity by blending the processing liquid with a liquid of a different viscosity to bring it to a predetermined standard or point. In the embodiment shown in Fig. 6 for this purpose I have added a diluting liquid to blend with the viscous processing liquid to bring it to the desired viscosity and in the embodiment shown in Fig. 7 I have added a more viscous liquid to blend with the weakened liquid to bring it to the desired viscosity.

In the embodiment shown in Fig. 8 I have corrected the viscosity by means of varying the temperature of the viscous liquid.

In the embodiment shown in Fig. 9 I have varied the viscosity by means of agitating the processing liquid in the system.

In all of the embodiments shown in Figs. 6–9, I have shown a standard processing system which requires a processing tank, although the only processing tank 201 shown is in the embodiment shown in Fig. 6. Sometimes a storage tank 203 for the processing liquid is also included as in the embodiments shown in Figs. 7, 8 and 9. One of these tanks, either the tank 201, the storage tank 203 or another tank 32, is used as the mixing tank. In the embodiments shown in Figs. 7–9, the processing liquid 30 is mixed in the mixing tank 32 which is also the processing tank. Any of the controls about to be described may be inserted in the processing tank 201, mixing tank 32 or the storage tank 203 wherever desired.

In all instances in the drawings, I have diagrammatically illustrated the sampling or transforming device 42 as enclosed in a casing and the recorder device 44 as enclosed in another casing being connected by the circuit 46. In the embodiments shown in Figs. 6–9, the entire electric circuits, including the recorder terminal block 248, all the relays, the horn 232 and the switch control panel 292, having the switches automatically actuated by the recorder, are mounted within the recorder box 44. I have also shown in all the drawings the liquid level control 205 having the two electrodes 207 and 209 depending therefrom adapted to descend below the liquid level 140, which operate through a control box 211 to control the valve 213 in the supply line 215 from the storage tank 203 as shown in Figs. 6–9. This device functions electrically so that whenever the level falls below the electrodes 207 and 209, the valve 213 will automatically open to fill the mixing tank 32 up to the desired liquid level and while such liquid level control can be incorporated as part of my invention, in the embodiment shown it is adapted to work separately.

In the embodiments shown in Figs. 7–9, a separate mixing and cooking tank 217 is employed connected by the pipe 219 to the storage reservoir 203 which has the valve 221 therein and a pump 223 therein for moving the processing liquid from the tank 217 to the storage tank 203. The tank 217 has a discharge pipe 225 having a shut-off valve 227 therein and the storage tank 203 has the discharge pipe 229 having the discharge valve 231 therein.

I also provide an extra control device 20' preferably affixed to the storage tank 203 in the embodiments shown in Figs. 7-9, with the cylinder 54' of its control portion 42' sticking into its tank and its recorder portion 44' electrically connected thereto, which serves as a check on the mixing and/or cooking of the ingredients of the processing liquid in the cooking tank 217.

As stated, the embodiment shown in Fig. 6 shows a processing system for use in sizing nylon yarns prior to knitting, comprising a processing tank 201 having the rolls 235 for passing the yarns therethrough. The processing system takes place as follows: The size is mixed in the mixing tank 32, passed through pipe 241 by the pump 259 which pumps it through the pipe 241 into the gravity feed tank 243 where it flows by gravity through the discharge pipe 245 into the processing tank 201, said pipe 245 having the shut-off valve 247 therein. The processing liquid discharges from the processing tank 201 through the discharge pipe 249 back to the mixing tank 32, said pipe also having a shut-off valve 251 therein. An overflow pipe 253 also extends from the gravity feed tank 243 to the mixing tank 32. The pipe 215 from the storage tank 203 in all embodiments has a manually operated valve 255 therein. In the embodiment shown in Fig. 6, the viscosity is automatically controlled through the measuring device 42—44 by means of an automatic valve 236 automatically controlled thereby in response to the measurements of the sampling device, resulting in corresponding movements of the movable element in the recorder. The control valve 236 is located in a diluent line 261 comprising water leading from a source of water supply into the mixing tank 32. As stated, this embodiment, therefore, shows a blending embodiment of my invention in which the processing liquid has its viscosity reduced by means of adding a diluent such as water thereto, as it has been found in practice that on repeated use the processing liquid or size 30 used to size the nylon yarns prior to knitting, becomes more viscous.

The embodiment shown in Fig. 7 also shows a blending embodiment which may add a thickening element through the supply line 263 to be discharged through the holes 265 in the extension 267 of the pipe 263 under the liquid level in the mixing tank 32. In this embodiment, the valve 236, controlled by the measuring element 42—44, is located in the supply line 263. If desired, however, the physical embodiment shown in Fig. 7 may also be employed as a diluent to admit a diluting liquid through the pipe 263. In this embodiment, the supplemental valves 269 are provided in the inlet pipe and the supplemental discharge pipe 271 is provided for the mixing tank 32, having the shut-off valve 273 therein.

I have shown in Fig. 8 a system for controlling the viscosity of the processing liquid by means of temperature and for this purpose I have shown the steam pipe 275 extending through the bottom of the mixing tank 32, passing into the tank through the steam inlet line 277. The valve 236 is located in the line 277, which in turn is controlled by the measuring device 42—44 to admit more heat to the bath when more is needed. The high temperature thermostat 279 located in the mixing tank 32 and connected by the lead 281 to the measuring device 42—44, functions to limit the temperature to a predetermined maximum value. In order to maintain the temperature at a minimum, a second thermostat 283 may also be located in the tank which may operate a temperature recorder 285, which, through a suitable controlling mechanism 282, may control the supplemental automatic valve 289 in the supplemental steam line 291 also connected to the horizontal steam pipe 275. If desired, for initial heating purposes a by-pass line 293 may be provided having the valve 295 therein for initially directly heating through pipe 275 and a by-pass line 297 may also be provided in the pipe 215 having the hand operated valve 299 therein for initially filling the tank 32 and in case it be needed to by-pass the level control 213. It is thus obvious that in accordance with this embodiment, the viscosity of the processing liquid 30 in the tank 32 is controlled by variations in the temperature thereof.

In the embodiment shown in Fig. 9, I have shown what I believe is a novel method for correcting viscosity by means of agitation of the processing liquid. While the liquid may be agitated in any suitable manner in the tank, such as by the mixing agitator 301 shown in Fig. 6, or in any other suitable fashion, for this purpose I have provided a recirculating line 303, branching from the discharge line 271 and having a pump 305 therein, which line 303 continues until it discharges in the upper portion of the mixing tank 32. In this embodiment, the measuring device 42—44 is directly connected to the pump 305 to actuate it in accordance with variations from a predetermined point in the standard of the viscosity required. In accordance with this embodiment, the control device 42—44 actuates the pump 305 as it agitates and recirculates the liquid through the line 303. The line 303 may be provided with a by-pass line 307 by-passing the pump 305 and returning to the line 303, having the shut-off valve 309 therein. A shut-off valve 311 may be provided near the entrance of the recirculating line 303 and a shut-off valve 313 may be provided near the end of the shut-off line 303. If desired, therefore, by closing the valves 311 and 313, a fixed amount of liquid may be trapped in the pipe 303 and the pump 305 actuated to recirculate it through the short portion of the line 303 between the terminals by the by-pass 307 and recirculate it around the by-pass 307, thereby providing a greater amount of agitation for a small amount of liquid.

In all of the embodiments, I have shown electrical mechanism connected up in the manner shown in Figs. 1-5 and now to be described in detail:

Due to the additions of the alarm circuit 242 and its actuating relay 238 and the control circuit 244 and its corresponding relay 240, it was necessary to redesign the electrical system shown in my aforementioned Patent No. 2,491,389, and connect the different parts together in a different manner and I preferably employ terminal blocks 246 and 248 in the measuring element and recorder casing respectively, all the parts for actuating the alarm and controls being suitably supplementally mounted in the recorder box.

I preferably employ the identical type of double throw double pole relay for the recorder cocking relay 68, the recorder firing relay 108, the alarm relay 238 and the control relay 240.

The cocking relay 68 or relay R1 is substantially identical to the relay shown in my prior application, but in place of the double pole single throw contacts shown therein, comprises a double pole double throw relay. I will refer to the respective relays and their various parts as relay RI (68) for the cocking relay, relay RII (108) for the firing relay, AR for the alarm relay 238 and CR for the control relay 240, and I will refer to their common respective parts as follows: Thus, each relay has the respective terminal 1 respectively connected to the upper left fixed contact 1 of the left switch; the respective terminal 2 connected to the movable contact 2 of the left switch respectively; the terminal 3 connected to the lower left fixed contact 3 of the left switch of each relay respectively; the terminal 4 connected respectively to the upper right fixed contact 4 of the right switch; the terminal 5 connected respectively to the movable contact 5 of the right switch; the terminal 6 connected respectively to the lower fixed contact 6 of the right switch of the respective relays; the terminal 7 connected respectively to one end of the respective relay coils RIC, RIIC, ARC, CRC of the respective relays and the terminal 8 connected respectively to the opposite ends of the coils RIC, RIIC, ARC and CRC respectively. The parts of each relay may be mounted on the respective panels 315 shown in dotted lines in Fig. 1 and mounted in the interior of the recorder casing.

I also employ a suitable control switch 250 in the control circuit 244 and a suitable high alarm switch 233 and a suitable low alarm switch 234 in the alarm circuit 242. In the embodiment shown, the specific switches, i. e., the control switch 250, the high alarm switch 233 and the low alarm switch 234 are identical and are provided with identical means for setting them. Each comprises a switch casing 256, having a front wall or cover 254, having a central hole therein. A resilient switch blade 257 is pivotally mounted on a contact pivot point 258 at one end of said casing which has a connecting wire 260 leading to the terminal 262 on the front of the casing. Two terminals 264 and 266 are mounted within the opposite end of the casing respectively one above the other, each of which has the wires 268 and 270 respectively connected to respective contacts 272 and 274 on the front of the casing. The front or cover of the casing 254 is provided with the central hole 276 in which the supporting sleeve 278 is mounted and the push button 280 is provided slidably mounted in said sleeve, having an inner end adapted to contact the blade 257 to push it inwardly. If a wire be attached to the control terminal 272 connected by the wire 268 to the terminal 264, the switch will function as a breakable switch breaking the current when the button 280 is pressed inwardly. If, however, an electric wire is connected to the terminal 274, connected by the wire 270 to the inner terminal 266, the switch will function as a "make" switch to close the circuit when the button is pushed inwardly to press the blade 257 against the contact 266. In each instance, the terminal 262 will be connected to the opposite blade end 258 by the wire 260, so that current may flow through the wire 260, the pivot contact 258, the switch blade 257 and to the respective terminal 264 or 266.

In each instance, a setting eccentric cam 282 is rigidly mounted relative to the movable switch casing 256, to cause pivotal movement thereof on rotation of said cam 282. For this purpose, each switch casing 256 may be mounted on an arm 284 vertically pivotally mounted on a suitable pivot 286 so that said switch casing 256 and its operating button 280 may pivot with said arm. The cam 282 is mounted on the horizontal shaft 288 rotatably mounted on a suitable bracket 290 projecting forwardly from a composite panel 292 or other suitable base and may have an indicating dial 294 having graduations 296 thereon rigidly mounted on the front end thereof and a fixed pointer 298 may be provided to denote the amount of rotation or setting of the dial 294, which denotes the position that the eccentric cam 282 abuts the pivotally mounted arm 284 or its respective casing 256, if desired.

The pen pivot shaft 90, hitherto described, may also be pivotally mounted on the vertical panel 292. As shown, the pen arm 24 may project forwardly and downwardly from the front end thereof over the chart 26. The pen arm operating arm 94 may also project downwardly from said pen pivot shaft 90 to be actuated by the rod 100 and the adjusting weight 99 may also be mounted on a rod 300 also mounted on said pen pivot shaft 90, in the embodiment shown through the medium of the collar 302 rigidly secured to said shaft 90, said collar also having the substantially uniform lift cam 304 projecting outwardly therefrom.

I provide means 306 oscillatable by said cam 304 slidably constrained by the suitable guideways such as the guide rollers 308 oscillatable to actuate the respective push buttons 280 of the desired switches. In the embodiment shown, said oscillatable means comprises a bar 306 slidably mounted on said guide rollers 308. To oscillate said bar 306, I provide the vertical bar 310 pivotally mounted as at 312 on the lower portion of the panel 292, having a pin 314 projecting laterally therefrom which may have a roller 316 mounted thereon projecting laterally from the upper end thereof adapted to be contacted by the substantially uniform lift cam 304. As the cam 304 pivots the vertical bar 310 outwardly, its outer end abuts the inner end of the oscillatable bar 306 to move it outwardly. I also provide suitable means to normally urge the oscillatable bar 306 inwardly, such as the spring 318, having its inner end connected to any suitable portion of the panel such as the pen arm operating arm stop 130 and its outer end connected to a vertical plate 320 rigidly soldered or otherwise secured to said bar 306 in front of the control switch 250. The upper end of said plate 320 is provided with the threaded hole 322 to receive an adjustable screw 324 which may be adjustably threaded therein and having an inner end 326 adapted to abut the operating button 280C of the control switch 250. The control switch casing 256C may be pivotally mounted on the upper end of the bar 284C having its lower end pivotally mounted as at 286C on the panel 292, so that the outer edge of said bar 284C will be opposite the periphery of the cam 282C and its push button 280C will be opposite the outer end of the adjusting screw end 326.

As stated, the control switch may be operated alone or any type of high and low alarm switches may be operated alone, but in my preferred embodiment I preferably employ, as stated, the same type of switches as the control switch 250 for the high alarm switch 233 and for the low alarm switch 234. As is apparent, the the dial 294C for the control switch is suitably mounted on the bracket 290C therefor so that its respective cam 282C may be set to regulate the viscosity at which the control circuit may function, in this instance the switch 250 being connected up to function as a normally open switch closed to complete a circuit on an outward movement of the bar 306, for this purpose being connected through the terminal 274C.

In the embodiment shown, identical switches are used for the high and low alarm switches 233 and 234 respectively and for this purpose one may be mounted above the other. In this instance, the low alarm switch is pivotally mounted on the upper end of a pivot bar 284LA pivotally mounted on the lower end of the panel 292 on the pivot pin 286LA, and the bracket 290LA is rigidly mounted on the panel 292 exterior of said switch casing 256LA so that its respective cam 282LA may be controlled by its dial 294LA to set the viscosity at which the low alarm switch 234 may be actuated. In this embodiment, the low alarm switch is connected up to the terminal 274LA to be normally open. In the specific embodiment shown so that the respective high and low alarm switches may be selectively operated by a tandem actuator, I pivotally mount the pivot bar 284HA on a pivot pin 286HA, mounted on the panel 292 at a spaced distance above the pivot 286LA. The switch casing 256HA is mounted as usual on the upper end of said pivot bar 284HA so that its operating button 280HA may project inwardly. The bracket 290HA is rigidly mounted on said panel 292 so that its cam 282HA may abut the outer surface of said pivot bar 284 and may be set, as usual, by movements of its dial 294HA. In this instance, however, it is desirable that the switch be normally closed, so in this instance the connecting wire is connected to the terminal 272HA thereof.

To actuate the high and low alarm switches 233 and 234, the oscillatable bar 306 is extended a distance outwardly and a tandem operating plate 328 is soldered or otherwise secured to the outer end thereof, preferably to an extension 330 projecting outwardly therefrom substantially centrally of said plate 328. The upper end of said plate is provided with the threaded hole 332 and the lower end of the plate is provided with the threaded hole 334 adapted to receive the threaded adjusting screws 336 and 338 threadedly adjustable within said holes to have their outer ends adjustably contact the respective buttons 280HA and 280LA of the respective high and low alarm switches 233 and 234 on outward oscillating movement thereof.

I also provide the alarm resetting button 340 having the handle 342 adapted to be depressed against the respective contacts 344 and 346. I also provide the main switch 348. The measuring element terminal block 246 has the respective contact terminals 1M, 2M, 3M, 4M, 5M, 6M, 7M, 8M, 9M and 10M mounted thereon. The terminal block 248 for the recorder and the balance of the electrical system has the terminals R1, R2, R3, R4, R5, R6, R7, R8, R9, R10, R11, R12, R13, R14 and R15 mounted therein. The fuses 350 are also provided for safety purposes.

While in general the sampling device and recorder function exactly similar to their corresponding parts shown in my application S. N. 552,292, filed September 1, 1944, aforesaid, i. e., through the resetting phase, the loading phase, the cocking phase, the firing phase of the loading or sampling phase, etc., and the cease firing phase thereof, due to the fact that my improved alarm system and control system are added, the electrical connections are different.

In general, the piston or droppable member 36 is slowly raised by the cam 56 operated by the motor 78 and then allowed to drop by gravity. A sample of liquid to be measured is drawn in through the lower orifices 144 as the piston 36 is raised and expelled when the piston is dropped. The time required for the piston to drop to the bottom of its travel is the measure of viscosity of the liquid and this measurement is transmitted to the recorder through a multi-conductor cable, the measurements then converted to electric signals of varying time durations are then converted to chart readings by means of motors, relays and other associated parts.

The piston 36 is attached to a rod 72 having a cam follower 138 on the upper end thereof which is raised by a cam 56 operated by the lift motor 78. Just before it reaches its uppermost position, the upper cam follower arm 166 raises the actuator 146 which releases the upper timing switch 117, thereby energizing the cocking relay R1 or 168. This relay has the holding contacts 1 and 2, so that it remains energized after the cam 56 rotates to a position where the cam follower 138 falls by gravity away from the cam, permitting the actuator 146 to depress the upper timing switch 117, bringing the movable contact 123 thereof into contact with the lower fixed contact 121 thereof. This completes the circuit through relay R1 from recorder terminal 2, through the lead 352 to terminal 8 of relay R1, through coil R1C to terminal 7 of relay R1, from there to terminal 2 of relay R1, through the lead 353 to the terminal R3 of the recorder block 248, through the lead 354 to terminal 3M of the measuring terminal block 246, through the lead 355 to the upper fixed contact 119 of the upper timing switch 117 to the movable contact 123 of said timing switch 117, through the lead 356 to the terminal 4M of the terminal measuring block 246, through the lead 357 to the movable terminal 128 of the recycling switch 66, through the fixed terminal 126 of said switch, through the lead 358 to terminal 1M of the measuring block 246, through the lead 359 to terminal R1 of the recorder block. The circuit energizing relay R11 can be followed by starting at terminal R2 in the recorder block 248, passing through the lead 352 to the terminal 8 in relay R1, then through lead 360 to terminal 7 of relay R11, through its coil R11C to terminal 8 of relay R11, through the lead 361 to terminal 5 of relay R1, then to terminal 4 of relay R1 through the contacts 5 to 4 (since relay R1 is energized), through the lead 362 to recorder block terminal R5, continuing on the lead 363 to the measuring element terminal M5, then through the lead 364, through the lower fixed and movable contacts 121 and 123 of the upper timing switch 117, through the lead 356 to the terminal 4M of the measuring block, through the lead 357 to the contacts 128 and 126 of the recycling switch 66, through lead 358 to terminal M1 on the measuring block, then through lead 359 to terminal R1 on the recorder block. The pen motor 58 continues to run until the piston 36 reaches the lower end of its dropping movement at which time the lower cam follower arm 62 actuates the lower timing switch 118 to separate the movable contact 120 from the fixed contact 122 thereof to break the circuit running to the pen motor. It is, therefore, obvious that for a higher viscosity, the cam follower and piston will drop at a slower rate, permitting the pen motor to run longer and therefore indicate a higher viscosity. A normally closed recycling switch 66 is provided and is open during a very small part of the cycle to deenergize the relays RI and RII and return the pen arm 24 to 0 (zero) preparatory to taking another reading. The recorder pen arm 24 is positioned by shaded pole reversing motor 58 which is referred to as the pen motor. This motor is constructed so that when one of the shaded windings is short circuited, the motor will run in one direction and when the other shaded winding is short circuited the motor will run in the opposite direction. The short circuit in either case is completed through a ground connection 365 which is common to the two shaded windings. Limit switches 134 and 214 are connected to the pen motor to limit the travel of the output shaft 98 to approximately 60°.

The recorder also contains a chart motor 88 which, through a suitable gear train (not shown), drives the chart 26 clockwise, in the embodiment shown making one complete revolution every 24 hours. The usual 110 volt power is supplied to the terminals L1 and L2 in the terminal block 248 from the line 172, through the fuses 350 to the primary coil 374 of the line transformer 174, and the transformer reduces the voltage to 25 volts, which is the operating voltage for all of the component parts used in this instrument.

It is believed that the operation of the viscometer can be best explained by describing in detail just what happens during one complete cycle. Therefore, first assume that all the various parts of the instrument are in the position shown in Fig. 1, the recycling switch 66 is open, the piston 36 is at the lower end of its travel, the lower timing switch 118 is held open by the lower cam follower arm 62, the upper timing switch 117 is held in its depressed position by the actuator 146, the relays RI and RII in the recorder are all deenergized, as shown, and the control point switch 250 is open. The high alarm switch 233 is closed and the low alarm switch 234 is open. To operate, the line switch 348 is turned to the "on" position which closes its contacts. The lift motor 78 starts to run as soon as the line switch is closed. The circuit energizing this motor is from terminal R2 in the recorder block 248 through the lead 375 to the terminal 2M in the measuring element terminal block 246 through the lead 376 to the motor 78 and from the lead 377 through the contact 1M of the terminal block 246, back through the lead 359 to the terminal R1 of the terminal block 248. After a short interval, the recycling switch 66 within the lift motor will close, due to its rotation of the cam 80 (see Fig. 4) and a short time later the cam 56 will begin to raise the cam follower 138, rod 72 and piston 36 hereinafter referred to as the piston assembly. As the piston assembly is raised a short distance, the lower arm 62 rising with the cam follower, will permit the contacts 120 and 122 of the lower timing switch 118 to close, but nothing else happens because contacts 4 and 5 in relay RII are open. The cam 56 continues to raise the cam follower 138 until just before it reaches its uppermost position, at which time the upper cam follower arm 166 raises the adjusting screw 164, which raises actuator 146, which in turn raises and releases the upper timing switch 117, permitting the normally upwardly raised movable contact 123 thereof to be separated from its lower fixed contact 121 and to contact its upper fixed contact 119, which thereby energized relay RI in the manner explained.

The line transformer 174 supplies power through the line switch 348 to the terminals R1 and R2 of the recorder block 248 and the circuit energizing cocking relay RI can be followed by starting at terminal R2 in the recorder block 248 as previously described.

The cam 56 proceeds to raise the cam follower 138 to its uppermost position where it drops completely off the cam by gravity and the downward travel of the piston assembly is then a function of the viscosity of the liquid which was drawn in through the orifices when the piston assembly was raised.

Soon after the cam follower 138 starts its downward travel, the actuator 146 is released and depresses the upper timing switch 117 closing its two lower contacts 121 and 123 which energizes relay RII. Relay RI is still held closed, because of its holding contacts 1 and 2 which are in parallel with the upper contacts 119 and 123 of the upper timing switch 117.

As soon as relay RII is closed, the pen motor 58 starts to run in the direction to move the pen arm from its 0 (zero) position. The circuit for this is from the shaded winding ground 365 of the pen motor through the shaded winding through the limit switch 214, through lead 366 to terminal R7 of the recorder block 248, through lead 367 to terminal M7 of the measuring block 246, through the lead 368 through the lower timing switch contacts 120 and 122 (which are still closed because the cam follower is in an intermediate position), through the lead 369 to terminal M6 of the measuring block 246, through the lead 370 to the terminal R6 of the recorder, then through the lead 371 to terminal 4 of relay RII, through contacts 4 and 5 of relay RII, through the lead 372 to ground 365, completing the short circuit of the up scale shaded winding. The pen motor 58 continues to run all the time the cam follower 138 is dropping and stops when the piston 36 reaches the end of its travel, at which time the lower cam follower arm 62 then abuts the movable contact 120 of the lower timing switch 118 to open the circuit between contacts 120 and 122, thus stopping the pen motor. The pen reading after the motor stops is therefore a measure of the viscosity of the liquid.

The pen arm 24 stays in this position until the cam 80 rotates to the point where the recycling switch 66 opens, thereby opening the circuit so that the relays RI and RII become deenergized. The pen motor 58 runs the pen arm 24 to the 0 (zero) position 60 as soon as relay RII becomes deenergized. The circuit for this is from the ground 365 to the down scale shaded winding of the motor 58, which runs the pen arm 24 downwards through the limiting switch 134 through the lead 373 to the terminal 6 of relay RII, through contacts 6 and 5 to terminal 5 of relay RII, through return 372 to ground 365. The motor 58 continues to run after the pen arm has reached the 0 (zero) position 60 until the limiting switch 134 is actuated.

The line switch 348 is connected into the circuit as shown, so that regardless of when the switch is turned to the off position, the lift motor 78 will run until the recycling switch 66 is opened. At that time, the piston 36 is always at the bottom of the cylinder 54, thus assuring that the instrument will never be turned off leaving a sample of the liquid being measured in the bottom of the cylinder to congeal and interfere with the proper functioning of the viscometer.

ALARM CIRCUIT

The automatic alarm circuit is composed of the high viscosity alarm adjustment and switch 233, the low viscosity alarm adjustment and switch 234, the alarm relay AR or 238, the alarm push button 342, and an alarm comprising a sound device or horn 232 which is usually mounted in the recorder casing. The points on the chart at which the alarm will sound are determined by the positions of the high and low viscometer adjustments 294HA and 294LA which can be set to any desired value. The alarm will sound whenever the alarm relay AR is deenergized. The circuit for energizing the alarm 232 is from terminal R2 of the recorder block 248 through the lead 352 to terminal 8 of relay RI, through the lead 360 to terminal 7 of relay RII, through the lead 378 to the off-on switch 348, through the return 379 to the terminal 7 of the alarm relay AR or 238, through the lead 380 to the terminal R9 of the recorder block 248, then through the lead 381 to the terminal R10 of the recorder block, through the lead 382 to the alarm terminal 383, through the alarm 232 from the alarm terminal 384, through lead 385 to terminal R11 of the recorder, then through lead 386 to terminal 3 of the alarm relay AR, through its lower contacts 3 and 2 to terminal 2 of the alarm relay AR and then through the lead 387 to terminal R1 of the terminal block 248. The alarm relay will also energize each time the alarm push button 342 is pressed. The circuit for this is from terminal R1 in the terminal block 248, through the lead 387 to terminal 2 of the alarm relay AR, through the lead 388 to the off-on switch 348, through the lead 389 to the terminal 5 of relay RII, through lead 390 to terminal 2 of relay RII, through lead 391 to the alarm push button 342, through lead 392 to terminal 8 of the alarm relay AR through its coil ARC to its terminal 7, through the lead 379 to the off-on switch 348, through the lead 378 to the terminal 7 of relay RII, through the lead 360 to terminal 8 of relay RI and through the lead 352 to terminal R2 in the terminal block 248. It is believed that the operation of the alarm circuit can be best described by explaining in detail just what happens during one complete cycle. First, assume that all the various parts of the instrument are in the position shown in Fig. 1. First, the off-on switch 348 is closed. The lift motor 78 starts to run and since the alarm relay AR is deenergized, the alarm 232 will sound. The alarm 232 can be immediately turned off by pressing the alarm push button 342 which energizes the alarm relay and opens the circuit to the alarm. After a short interval, the recycling switch 66 will close and a short time later the cam 56 will begin to raise the piston assembly to its uppermost position, where it drops completely off and the relays RI and RII are then energized, thus causing the pen motor 58 to run and consequently move the pen arm 24 to register the viscosity of the liquid that was drawn into the orifices when the piston assembly was raised. The pen reading can be in any of the following positions on the chart: (A) below the low viscosity alarm setting, (B) between high and low viscosity alarm settings, (C) above high viscosity alarm setting.

A. *Pen below the low viscosity alarm setting*

If the pen is in this position, then the high alarm switch 233 will be closed, and the low alarm switch 234 will be open. Therefore, when the recycling switch 66 opens, the alarm relay AR will deenergize and the alarm 232 will sound, indicating low viscosity. This alarm will not shut off until either the alarm push button 342 is depressed or a viscosity reading above the low alarm setting is registered.

B. *Pen between the low viscosity and high viscosity alarm settings*

If the pen arm 24 is in this position, then both high and low viscosity alarm switches 233 and 234 will be closed. Therefore, when the recycling switch 66 opens, the alarm relay AR or 238 will tend to momentarily deenergize, but will reenergize immediately after relay RII is deenergized. The circuit reenergizing the alarm relay with the recycling switch open is from the terminal R2 in the recorder through the lead 352 to terminal 8 of relay RI, through the lead 360 to terminal 7 of relay RII, through the lead 378 to the off-on switch 348 and the lead 379 to terminal 7 of the alarm relay AR, through the coil ARC to the terminal 8 of the alarm relay AR, then through the lead 393 to terminal 4 of the alarm relay AR, through the lead 394, through the low alarm switch 234, through the lead 395 to the high alarm switch 233, through the lead 396 to terminal 3 of relay RII, through its contacts 3 to 2 to its terminal 2, through lead 390 to the terminal 5 of relay RII, through the lead 389 to the off-on switch 348, through the lead 388 to terminal 2 of the alarm relay AR and through the lead 387 to the terminal R1 of the recorder block 248. When the pen returns to 0 (zero) position and thus mechanically opens the low alarm switch in the manner described, the alarm relay AR or 238 still remains energized through its holding contacts 4 and 5 and, therefore, the alarm will not sound.

C. *Pen above the high viscosity alarm setting*

If the pen is in this position, then the high alarm switch 233 will be open and the low alarm switch 234 closed. Therefore, when the recycling switch 66 opens, the alarm relay AR will deenergize and the alarm 232 will sound indicating high viscosity. However, as soon as the pen, which is moved towards the zero mark, goes below the high alarm setting, the high alarm switch will be mechanically closed in the manner heretofore described and the alarm relay will be energized, thus turning off the alarm. The circuit energizing alarm relay for this purpose is the same as that described in the previous paragraph.

CONTROL CIRCUIT

The automatic control circuit is composed of the control point adjustment 294C, control point switch 250, control relay 240 or CR, and external motor operated faucet valve 236. For this purpose, the valve 236 is actuated by a solenoid rod 237, which in turn is actuated by a solenoid coil 239. The point on the chart at which the instrument will control the viscosity is determined by the position of the control point adjustment 294C which can be set to any desired value. The valve solenoid coil 239 is connected to a suitable source of power through the control circuit in terminals R13 and R14 in the recorder block 248 in such a manner as to cause the solenoid 239 to function to open the valve 236 to correct the viscosity when it deviates from the control point.

The circuit for energizing the solenoid 239 is from the terminal R2 of the recorder block 248, through the lead 398 to the terminal R14, through the lead 399 to the solenoid terminal 400 of the valve solenoid coil 239; thence, from the terminal 401 thereof through the lead 402 to the terminal R13 of the recorder block, through the lead 403 to the terminal 1 of the control relay CR, from the fixed contact 1 thereof, to the movable contact 2 thereof to the terminal 2 of said control relay CR, thence through lead 404 to the terminal R1 of the terminal block 248.

These connections are such as to energize the solenoid coil 239 to open the solenoid operated valve 236 to correct the viscosity when it is above the control point in the embodiment shown in Figs. 1 and 6 by admitting a fluid of less viscosity through the valve 236.

The control circuit is designed so as to provide either one way or two way control. I have shown in Fig. 1 a structure adapted to correct the viscosity by admitting a diluting liquid of less viscosity should the viscosity of the liquid increase above normal viscosity.

I have shown in Fig. 7 a structure which will admit liquid of a higher viscosity in case the viscosity of the processing liquid should decrease below its desired viscosity, and in either instance my improved device will make the necessary corrections to bring the viscosity back to normal.

If the device shown in Fig. 7 is employed, lead 402 must be removed from R13 and connected to R15 which becomes connected through the lead 405 to the contact 3 of the control relay CR which is connected to the lower fixed contact 3 thereof which in turn becomes connected by the movable contact 2 thereof, connected by the lead 404 to the terminal R1 of the recorder block, thereby energizing the circuit to open the valve when the control relay is deenergized rather than when it is energized as in the embodiment shown in Fig. 1.

*Corrections made only when the viscosity is above normal*

The control circuit to perform this function is wired as shown in Fig. 1, except that the lead 412 between the terminals 4 and 8 of the control relay may be removed. The control point switch 250 will be mechanically closed each time the pen is moved above the control point, which in turn energizes the control relay. The circuit for this is from the terminal R2 in the recorder block 248 through the lead 352 to terminal 8 on relay RI, then through the lead 360 to terminal 7 of relay RII, then through lead 378 to the off-on switch 348, then through lead 379 to terminal 7 of the alarm relay AR, then through the lead 406 to terminal 7 of the control relay CR, then through the coil CRC of the control relay to its terminal 8, then through the lead 407 to the control point switch 250 (which is closed since the pen has been assumed to be above the normal viscosity reading), then through lead 408 to terminal 3 of relay RII, then through lead 409 to terminal 1 of relay RI, then through lead 410 to terminal R4 in the recorder block 248, then through the lead 411 to terminal M4 of the measuring block 246, then through the lead 357 to the recycling switch 66, then through lead 358 to terminal M1 of the measuring block 246 and finally through the lead 359 back to terminal R1 in the recorder block 248.

When the control relay is energized, the solenoid valve 236 is opened to permit a solution of lighter viscosity to enter and consequently bring the viscosity of the liquid being measured back to normal.

*Corrections made only when viscosity is below normal*

The control circuit will perform this function when wired as shown in Fig. 1 with the line 402 connected to the terminal R15 instead of the terminal R13. The reason for having the connecting lead 412 between the terminals 4 and 8 of the control relay CR is so that the control circuit 244 will be able to differentiate between the registered low viscosity reading of the pen and pen movements during each cycle.

When contacts 2 and 3 of the control relay CR are closed, the circuit is energized to open the valve 236 and when they are opened, the circuit is deenergized permitting the valve to close.

In order to best understand the operation of the control relay for use in the embodiment shown in Fig. 7, consider first that the pen 92 registers normal viscosity, thus having control point switch 250 closed and the control relay CR or 240 energized and the solenoid valve 236 closed. When the recycling switch 66 opens, the pen arm 24 will start moving towards zero. The control relay CR will tend to deenergize normally but will immediately reenergize as soon as contacts 2 and 3 of the relay RII close. The circuit for this is from terminal R2 of the recorder block 248 through the lead 352 to terminal 8 of relay RI, then through the lead 360 to terminal 7 of relay RII, through lead 378 to off-on switch 348, through lead 379 to terminal 7 of the alarm relay AR or 238, then through lead 406 to terminal 7 of the control relay CR, through its coil CRC to its terminal 8, then through lead 407 to the control point switch 250 (which is still closed as the pen has just started moving towards the zero mark and is still above the control point), through lead 408 to terminal 3 of relay RII, then through its contacts 3 and 2 to its terminal 2, then through the lead 390 to its terminal 5, then through the lead 389 to the off-on switch 348, then through the lead 388 to the terminal 2 of the alarm relay AR and then through the lead 387 to terminal R1 of the recorder block 248. When the pen arm 24 moves below the control point adjustment, the control point switch 250 will open, but the control relay CR will remain energized because of its holding contacts 4 and 5. If during the next cycle a lower viscosity reading is registered, the control switch 250 will be opened and when the recycling switch 66 opens the control relay CR will deenergize and thus energize the solenoid coil 239 to open the valve 236, which in turn will let in a solution of higher viscosity to bring the viscosity of the liquid being measured back to normal.

It is obvious, however, that if desired the apparatus shown in Figs. 1, 6 and 7 may be combined through the same electrical connections shown to add either a liquid of higher viscosity to correct the viscosity of the processing liquid, or a liquid of a lower viscosity to correct the viscosity of the processing liquid. It is obvious that in any of the combinations shown or contemplated, it is advisable to employ an automatic level control in association with the viscosity control to prevent overflowing of the tanks.

The operation of my improved apparatus is clear from the above description which has carefully traced all of the operating circuits and the movements of the various parts. It is obvious that the measuring device functions just as in my prior application, although, if desired, the movable element in the combination may be any other movable element than a part associated with the pen arm of a recorder. The sampling device functions to take the samples to measure them and in accordance with said measurements the control device accurately functions through the control switch 250 and control relay CR to change the physical characteristics of the liquid in any of the manners explained, any of the mixing tanks 32 or other tanks shown in Figs. 6–9 being substituted for the tank 32 shown in Fig. 1, if desired, and any of the other controlling means than the faucet 236 being substituted for said faucet valve to effect the control. The high and low alarms function through the alarm relay AR to function when the viscosity gets too high or too low, if the automatic feature be employed, in addition thereto; if not, as a signal to the operator to change the controls in accordance therewith.

It is apparent that I have provided a novel method of controlling the viscosity of a liquid in a processing system and novel types of apparatus for use therein with the advantages described above.

It is understood that my invention is not limited to the specific embodiments shown or methods described and that various deviations may be made therefrom without departing from the spirit and scope of the appended claims.

What I claim is:

1. Apparatus for controlling the viscosity of a body comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, and control means responsive to the duration of the traversing period of the droppable body for changing the physical characteristics of the body of liquid to maintain the viscosity of liquid within preselected limits.

2. Apparatus for controlling the viscosity of a body of liquid comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, means for changing the temperature of the body of liquid, and control means responsive to the duration of the traversing period of the droppable body to control the temperature changing means to maintain the viscosity of the body of liquid within preselected limits.

3. Apparatus for controlling the viscosity of a body of liquid comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, means for adding liquid to the body, and control means responsive to the duration of the traversing period of the droppable body to control the liquid adding means to maintain the viscosity of the body of liquid within preselected limits.

4. Apparatus for controlling the viscosity of a body of liquid possessing certain thixotropic characteristics comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing fluid entrapped within the tubular member is a function of the viscosity thereof, means for timing the duration of said droppable body in traversing a predetermined portion of said entrapped fluid, means for agitating the body of liquid, and control means responsive to the duration of the traversing period of the droppable body to control the agitating means to maintain the viscosity of the body of liquid within preselected limits.

5. Apparatus for controlling the viscosity of a tank of liquid possessing certain thixotropic characteristics comprising a tubular member adapted to be substantially vertically suspended in the liquid, the lower end of said tubular member being provided with an aperture so that the liquid flows therein, a droppable body disposed within said tube, means for periodically elevating and releasing said droppable body whereby the period of its traversing fluid entrapped within the tubular member is a function of the viscosity thereof, means for timing the duration of said droppable body in traversing a predetermined portion of said entrapped fluid, a pump for recirculating the liquid in the tank, and control means responsive to the duration of the traversing period of the droppable body to control the pump to maintain the viscosity of the liquid in the tank within preselected limits.

6. Apparatus for controlling the viscosity of a body of liquid comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, means for changing the physical characteristics of the body of the liquid, and control means including switch means operated by the timing means to control the means for changing the physical characteristics of the liquid to maintain the viscosity within preselected limits.

7. Apparatus for controlling the viscosity of a body of liquid possessing certain thixotropic characteristics comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, means for agitating the body of liquid thereby to change its viscosity, and control means including switch means operated by the timing means to energize the agitating means to maintain the viscosity of the body of liquid within preselected limits.

8. Apparatus for controlling the viscosity of a body of liquid possessing certain thixotropic characteristics comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, a pump for recirculating the liquid thereby to change its viscosity, and control means including switch means operated by the timing means to energize the pump to maintain the viscosity of the body of liquid within preselected limits.

9. Apparatus for controlling the viscosity of a body of liquid comprising a tubular member adapted to be substantially vertically suspended within the body of liquid, the lower end of said tubular member being provided with an aperture so that the liquid flows therein; a droppable body disposed within said tube, means for periodically elevating and releasing said droppable body whereby the period of its traversing the fluid entrapped within the tubular member is a function of the viscosity thereof; means including switches operable at the beginning and end of the timing period, a constant speed motor controlled by said switches, a member moved by said motor a distance proportional to the duration of said droppable body in traversing a portion of said entrapped fluid determined by the operating of said switches; means for changing the physical characteristics of the body of the liquid; relay means for controlling the means for changing the physical characteristics; and a control switch operated by the movable member to energize the relay means to maintain the viscosity of the body of liquid within preselected limits.

10. Apparatus for controlling the viscosity of a body of liquid possessing certain thixotropic characteristics comprising a tubular member adapted to be substantially vertically suspended within the body of liquid, the lower end of said tubular member being provided with an aperture so that the liquid flows therein; a droppable body disposed within said tube, means for periodically elevating and releasing said droppable body whereby the period of its traversing the fluid entrapped within the tubular member is a function of the viscosity thereof; means including switches operable at the beginning and end of the timing period, a constant speed motor controlled by said switches, a member moved by said motor a distance proportional to the duration of said droppable body in traversing a portion of said entrapped fluid determined by the operating of said switches; means for agitating the body of liquid thereby to change its viscosity; relay means for controlling the agitating means; and a control switch operated by the movable member to energize the relay means to maintain the viscosity of the body of liquid within preselected limits.

11. Apparatus for controlling the viscosity of a body of liquid possessing certain thixotropic characteristics comprising a tubular member adapted to be substantially vertically suspended within the body of liquid, the lower end of said tubular member being provided with an aperture so that the liquid flows therein; a droppable body disposed within said tube, means for periodically elevating and releasing said droppable body whereby the period of its traversing the fluid entrapped within the tubular member is a function of the viscosity thereof; means including switches operable at the beginning and end of the timing period, a constant speed motor controlled by said switches, a member moved by said motor a distance proportional to the duration of said droppable body in traversing a portion of said entrapped fluid determined by the operating of said switches; a pump for recirculating the liquid thereby to change its viscosity; relay means for controlling the pump; and a control switch operated by the movable member to energize the relay means to maintain the viscosity of the body of liquid within preselected limits.

12. Apparatus for controlling the viscosity of a body of liquid comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, control means responsive to the duration of the droppable body for changing the physical characteristics of the body of liquid to maintain the viscosity of the liquid within preset limits, and alarm means operated by the timing means when the traversing period is beyond a preset limit.

13. Apparatus for controlling the viscosity of a body of liquid comprising a tubular member adapted to be substantially vertically suspended within the body of liquid, the lower end of said tubular member being provided with an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, control means responsive to the duration of the droppable body for changing the physical characteristics of the body of liquid to maintain the viscosity of the liquid above a preset lower limit, and alarm means operated by the timing means when the traversing period is below a preset limit.

14. Apparatus for controlling the viscosity of a body of liquid comprising a tubular member adapted to be substantially vertically suspended within the body of liquid, the lower end of said tubular member being provided with an an aperture so that the liquid flows therein, a droppable body disposed within said tube, means for periodically elevating and releasing said droppable body whereby the period of its traversing the fluid entrapped within the tubular member is a function of the viscosity thereof, means for timing the duration of said droppable body in traversing a predetermined portion of said entrapped fluid, control means responsive to the duration of the droppable body for changing the physical characteristics of the body of liquid to maintain the viscosity of the liquid below a preset upper limit, and alarm means operated by the timing means when the traversing period is above a preset limit.

15. Apparatus for controlling the viscosity of a body of liquid comprising a tubular member adapted to be substantially vertically suspended within the body of liquid, the lower end of said tubular member being provided with an aperture so that the liquid flows therein; a droppable body disposed within said tube; means for periodically elevating and releasing said droppable body whereby the period of its traversing the fluid entrapped within the tubular member is a function of the viscosity thereof; timing means including switches operable at the beginning and end of the timing period, a constant speed motor controlled by said switches, and a member moved by said motor a distance proportional to the duration of said droppable body in traversing a portion of said entrapped fluid determined by the operating of said switches; control means responsive to the duration of the droppable body for changing the physical characteristics of the body of liquid to maintain the viscosity of the liquid within preset limits, and alarm system including signalling means and a swtch operated by the movable member to energize the signalling means when the viscosity and therefore the position of the movable member are beyond such preset limits.

16. Apparatus for controlling the viscosity of a body of liquid comprising a tubular member adapted to be substantially vertically suspended within the body of liquid, the lower end of said tubular member being provided with an aperture so that the liquid flows therein; a droppable body disposed within said tube; means for periodically elevating and releasing said droppable body whereby the period of its traversing the fluid entrapped within the tubular member is a function of the viscosity thereof; timing means including switches operable at the beginning and end of the timing period, a constant speed motor controlled by said switches, and a member moved by said motor a distance proportional to the duration of said droppable body in traversing a portion of said entrapped fluid determined by the operating of said switches; control means responsive to the duration of the droppable body for changing the physical characteristics of the body of liquid to maintain the viscosity of the liquid within preset limits, and alarm system including signalling means and two switches operated by the movable member to energize the signalling means, one of the switches being operated when the viscosity and therefore the position of the movable member is below a preset lower limit, the other switch being operated when the viscosity and therefore the position of the movable member is above a preset upper limit.

17. Apparatus for controlling the viscosity of a body of liquid comprising a tubular member adapted to be substantially vertically suspended within the body of liquid, the lower end of said tubular member being provided with an aperture so that the liquid flows therein; a droppable body disposed within said tube; means for periodically elevating and releasing said droppable body whereby the period of its traversing the fluid entrapped within the tubular member is a function of the viscosity thereof; timing means including control switches operable at the beginning and end of the timing period, a constant speed motor controlled by said switches, a member moved by said motor a distance proportional to the duration of said droppable body in traversing a portion of said entrapped fluid determined by the operating of said switches and a recycling switch for resetting the timing means; an alarm system including signalling means; and an alarm relay including normally closed contacts for energizing the signalling means, normally open holding contacts and a solenoid for operating said contacts, the solenoid being energized by a series circuit including the recycling switch and a normally open switch closed by said movable member only when the viscosity is above a preset lower limit, said normally open switch also being connected in parallel with the relay hold contact whereby the signalling means does not give a false alarm during recycling.

18. The method of maintaining the viscosity of a body of liquid within preselected limits comprising the steps of measuring the viscosity of the liquid, and agitating the liquid an amount determined by the difference between the measured viscosity and the preset limits so that the viscosity of the body of liquid is brought within such limits.

19. The method of maintaining the viscosity of a body of liquid within preselected limits comprising the steps of measuring the viscosity of the liquid, and recirculating the liquid to change its viscosity, the amount of recirculation being determined by the difference between the measured viscosity and the preset limits so that the viscosity of the body of liquid is brought within such limits.

20. The method of maintaining the viscosity of a body of liquid above a preselected lower limit comprising the steps of measuring the viscosity of the liquid, and recirculating the liquid to increase its viscosity, the amount of recirculation being determined by the difference between the measured viscosity of the preselected limit so that the viscosity of the body of liquid is brought above such limit.

21. The method of maintaining the viscosity of a body of liquid below a preselected upper limit comprising the steps of measuring the viscosity of the liquid, and recirculating the liquid to decrease its viscosity, the amount of recirculation determined by the difference between the measured viscosity and the preselected limit so that the viscosity of the body of liquid is brought below such limit.

22. Apparatus for controlling the viscosity of a body of liquid possessing certain thixotropic characteristics comprising means for measuring the viscosity of the liquid, separate means for agitating the liquid thereby to change its viscosity, and control means for the agitating means responsive to the measuring means to maintain the viscosity within preset limits.

23. Apparatus for controlling the viscosity of a body of liquid possessing certain thixotropic characteristics comprising means for measuring the viscosity of the liquid, separate means for recirculating the liquid thereby to change its viscosity, and control means for the recirculating means responsive to the measuring means to maintain the viscosity within preset limits.

24. Apparatus for controlling the viscosity of a body of liquid possessing certain thixotropic characteristics comprising means for measuring the viscosity of the liquid, a pump for recirculating the liquid thereby to increase its viscosity, and control means for the recirculating pump responsive to the measuring means to maintain the viscosity above a preset lower limit.

25. Apparatus for controlling the viscosity of a body of liquid possessing certain thixotropic characteristics comprising means for measuring the viscosity of the liquid, a pump for recirculating the liquid thereby to decrease its viscosity, and control means for the recirculating pump responsive to the measuring means to maintain the viscosity below a preset upper limit.

AUSTIN S. NORCROSS.

REFERENCES CITED

The following references are of record in the file of this patent:

UNITED STATES PATENTS

| Number | Name | Date |
|---|---|---|
| 1,361,676 | Brewer | Dec. 7, 1920 |
| 1,472,125 | Keeler | Oct. 30, 1923 |
| 1,534,091 | Smoot | Apr. 21, 1925 |
| 1,654,614 | Smith | Jan. 3, 1928 |
| 1,870,982 | Behr | Aug. 9, 1932 |
| 1,925,833 | French | Sept. 5, 1933 |
| 1,930,353 | Doyle | Oct. 10, 1933 |
| 1,944,243 | Kegl | Jan. 23, 1934 |
| 2,272,970 | Frymoyer | Feb. 10, 1942 |
| 2,339,289 | Olken | Jan. 18, 1944 |
| 2,377,363 | Noble | June 5, 1945 |
| 2,452,142 | Pecker | Oct. 26, 1948 |
| 2,491,389 | Norcross | Dec. 13, 1949 |